United States Patent Office 3,036,031
Patented May 22, 1962

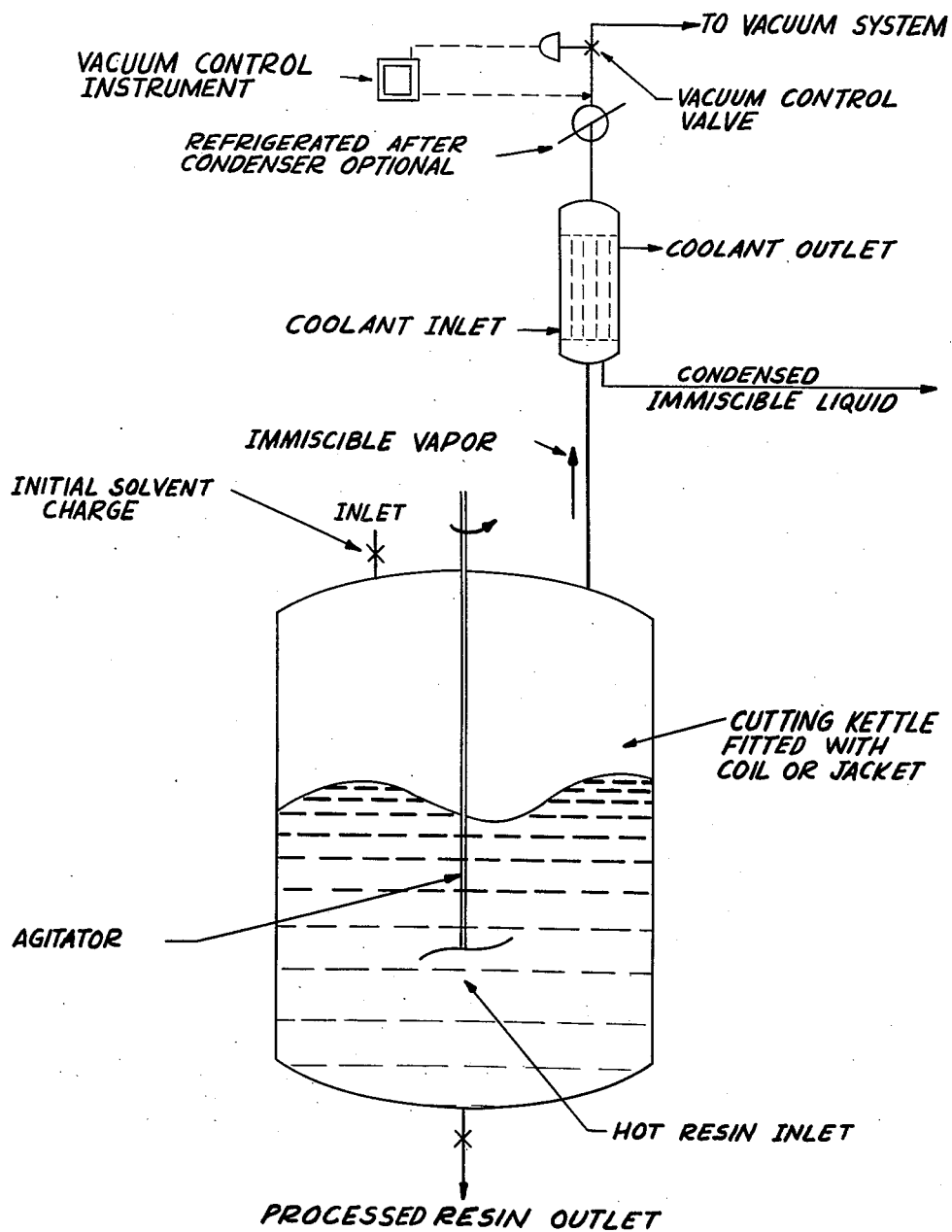

3,036,031
PROCESS FOR BLENDING A HOT POLYESTER RESIN WITH A HIGH BOILING POLYMERIZABLE MONOMERIC MATERIAL IN THE PRESENCE OF A HEAT-TRANSFER LIQUID
William Dean Holland, Metuchen, N.J., assignor to American Cyanamid Company, New York, N.Y., a corporation of Maine
Filed Oct. 23, 1959, Ser. No. 848,256
6 Claims. (Cl. 260—45.4)

This invention relates to a process for handling hot polyester resins which are to be blended with a high boiling polymerizably reactive diluent. Still further, this invention relates to a technique for blending a hot polyester resinous material with a normally-liquid, high boiling polymerizably reactive diluent in the presence of a heat-transfer liquid material having a comparatively low boiling point.

One of the objects of the present invention is to blend a hot polyester resinous material with a normally-liquid, high boiling, polymerizably reactive diluent in the presence of a heat-transfer liquid material having a comparatively low boiling point. A further object of the present invention is to cut hot polyester resin compositions with a normally-liquid, high boiling, polymerizably reactive diluent in the presence of a heat-transfer liquid material having a boiling point below 200° C. while subjecting the system to a partial vacuum so as to remove some of the sensible heat by the volatilization of the heat-transfer liquid. These and other objects of the present invention will be discussed in greater detail hereinbelow.

The resinous materials used in the present invention are unsaturated polyester resins prepared by reacting a polyhydric alcohol and preferably a dihydric alcohol with an alpha, beta-ethylenically unsaturated polycarboxylic acid and preferably an alpha, beta-ethylenically unsaturated dicarboxylic acid. The unsaturated polyester resins used in the present invention are blended with a polymerizable monomer and upon proper catalysis are converted to a thermoset condition into such useful materials as laminates and the like.

In order to achieve substantially complete esterification of the polycarboxylic acid with the polyhydric alcohol, heating is continued at elevated temperatures in the range of about 150° C. to about 250° C. until a relatively low acid number is achieved. There is no significant criticality in the acid number although generally it is desired to continue the reaction until the acid number has dropped below 100 and preferably below about 40. It is frequently conventional in certain instances to continue the esterification reaction until the acid number has dropped below 10. To accomplish this, it is generally desired to utilize the polyhydric alcohol in an amount calculated, on a stoichiometrical basis, to be sufficient, and preferably in excess by 10% to 30% of the amount required to completely esterify the polycarboxylic acid or acids present. After the esterification has been completed to the selected acid number, the hot resinous material, having a temperature varying between about 150° C. and 250° C. and more particularly as a rule between about 180° C. and 210° C., requires cooling before it is cut with a polymerizably reactive solvent. If the cutting operation is accomplished at elevated temperatures with a polymerizably reactive solvent having a comparatively low boiling point, one runs the risk of losing valuable polymerizable monomer by volatilization and also runs the risk of polymerizing some of the monomer in the cutting kettle, each of which are undesirable. However, when a high boiling polymerizably reactive monomer is used, i.e., one having a boiling point above 250° C., it should be apparent that the introduction of the hot resin into such a high boiling monomer will not result in the volatilization of any appreciable amount of the monomer but will cease the undesirable effect of polymerization in the cutting kettle. This is to be avoided. In the prior art, it has become conventional practice to cool the hot polyester resin down from its esterification temperature to a temperature not appreciably below 150° C. in order to avoid this undesirable polymerization. This cooling down step consumes considerable time and also presents an added problem in that the polyester resin at the lower temperatures frequently become so viscous as to become difficult to handle. By the practice of the process of the present invention, one can introduce the hot polyester resin into the cutting kettle containing the high boiling polymerizably reactive monomer and also containing a heat transfer liquid material having a boiling point below 200° C. and can accomplish the cutting operation without loss of time, loss of monomers and without the undesirable premature conversion of monomer to polymer. The heat-transfer liquid material having the boiling point below 200° C. volatilizes upon contact with the hot polyester resin, and in doing so, removes some of the sensible heat from the polyester resin. The heat-transfer liquid upon volatilization is passed up through a condenser which is capable of extracting the heat from the vaporized liquid, condensing the same and returning said liquid to the cutting kettle for further use in the cutting operation. A vacuum is placed on the system so as to reduce the temperature at which the heat-transfer liquid will boil. After the hot polyester resin addition has been completed, the heat-transfer liquid can be removed from the cutting kettle in the same volatilization step and upon condensation is removed form the system and not returned thereto. It can be seen from this that the technique of the present invention saves time and materials and produces a better product more quickly.

In the preparation of the polyester resins of the present invention, one may utilize any of the polyhydric alcohols such as ethylene glycol, propylene glycol, diethylene glycol, dipropylene glycol, trimethylene glycol, tetramethylene glycol, pinacol, arabitol, xylitol, adonitol, mannitol, glycerol, trimethylol propane, trimethylol ethane, sorbitol, pentaerythritol, dipentaerythritol, or the alkane diols such as butanediol-1,4, pentanediol-1,5, hexanediol-1,6, and the like. These polyhydric alcohols may be used either singly or in combination with one another. It is generally preferred that the polyhydric alcohol used be predominantly a dihydric alcohol although minor amounts up to about 10 to 25% of higher hydric alcohols such as trihydric, tetrahydric, hexahydric alcohols may be used. In the unsaturated polyester resins, it is generally desired that there be produced a linear polyester resin with polymerizable sites available for cross-linking with the polymerizably reactive monomer. For the purpose of making unsaturated polyester resins then, it can be seen that the diols, and more particularly the glycols, are preferred. When the blend of a dihydric alcohol with a polyhydric alcohol having more than two hydroxy groups are utilized, the average functionality of the alcohols used should not be significantly above about 2.25.

In the preparation of the polyester resins used in the process of the present invention, one may utilize such polycarboxylic acids as those polycarboxylic acids which are free of non-benzenoid unsaturation including phthalic acid, oxalic acid, malonic acid, succinic acid, glutaric acid, sebacic acid, adipic acid, pimelic acid, suberic acid, azelaic acid, tricarballylic acid, citric acid, tartaric acid, malic acid, and the like. Obviously, these acids may be used either singly or in combination with one another and the anhydrides of said acids, whenever available, may be used either singly or in combination with one another or in combination with the acids. Among the alpha, beta-ethylenically unsaturated polycarboxylic acids which may be used in the practice of the process of the present invention are maleic acid, fumaric acid, aconitic acid, itaconic acid, chloromaleic acid, and the like. The anhydrides of these acids may be used, whenever available. These acids and/or their anhydrides may be used either singly or in combination with one another. In the unsaturated polyester resins, it is desirable to utilize the alpha, beta-ethylenically unsaturated acids in an amount approximating at least 20% by weight of the total weight of the polycarboxylic acids used and preferably in amounts varying between about 25% and 65% by weight based on the total weight of polycarboxylic acid used, the balance being polycarboxylic acids free of non-benzenoid unsaturation.

The polymerizable monomeric materials having a boiling point above 250° C. which can be used in the practice of the process of the present invention include triallyl cyanurate, triallyl isocyanurate, allyl maleate, diallyl phthalate, diallyl chloromethane phosphonate, diallyl benzene phosphonate, triallyl trimesate, and the like. The mode of addition of the hot polyester resin to the mixture of high boiling monomer and low boiling heat-transfer liquid is not critical. The hot uncut resin may be introduced into the cutting kettle into which there has been introduced a predetermined quantity of each component of the liquid mixture. The amount of polymerizable monomer charged to the kettle prior to the introduction of hot polyester resin is a matter of choice depending for instance on the desired formulation of the ultimate resinous material. For instance, one would predetermine the amount of polymerizably reactive monomeric solvent charged to the cutting kettle based on the amount desired in the ultimate composition. For these polyester resin compositions one may utilize between about 10 parts by weight of the monomeric solvent to about 90 parts of the unsaturated polyester resin up to about 60 parts of the monomeric material to about 40 of the polymerizable unsaturated polyester resin. Preferably, one should use between about 25 parts of the monomeric solvent to about 35 parts of the monomeric solvent with a correspondingly 75 parts to about 65 parts of the polymerizable unsaturated polyester resin.

The hot polyester resin immediately upon substantially complete esterification will be conveyed directly to the cutting kettle. To avoid viscosity increases due to temperature drop, the hot polyester resin can be conveyed through steam jacketed pipes to the cutting kettle. It will be apparent that it is extremely desirable that the materials within the cutting kettle be kept under constant agitation during the cutting step in order to achieve uniform distribution of the resin in the solvent and in order to maintain uniform heat distribution. To achieve this under optimum conditions, the hot uncut resin can be introduced into the cutting kettle beneath the surface of the resident solvent and preferably at a point substantially immediately below the agitator. This can be accomplished by utilizing a steam jacketed pipe finger. Since the solvent material is a polymerizably reactive monomeric solvent, it will sometimes be desirable to incorporate therein a polymerization inhibitor, many of which are known in the prior art. These polymerization inhibitors may be used in amounts varying from about 0.001% to about 3% by weight based on the total weight of the polymerizable solvent. Illustrative of the conventional types of polymerization inhibitor which are used are hydroquinone, ortho-cresol, meta-cresol, para-cresol, 2,6-ditertiary butyl-4-methyl phenol, orcinol, resorcinol, 2-chloro-5-hydroxy toluene, 2-amino-5-hydroxy toluene, and many others. The prior art as represented by the U.S. Patents 2,457,657, 2,480,928 and 2,632,751 is illustrative of further inhibitors which may be used in the polymerizable solvent in the present invention.

The heat-transfer liquid material used in the practice of the process of the present invention should be normally liquid, i.e. a material with a melting point below about 25° C. and preferably about 0° C. The boiling point of this heat transfer material should not exceed about 200° C. Furthermore, this heat transfer material should be an inert material with respect to the reactants from which it transfers heat in the system. The concept of inertness is intended to reflect substantially complete inertness under the conditions of usage and may under other conditions be considered to be less than completely inert. The heat-transfer material should be easily separable from the system after the cutting has been completed. The preferred material to be used as a heat transfer material is water, because it meets all of the characteristics preferred for such a system outlined hereinabove and additionally is immiscible to the system. Immiscibility in the heat-transfer material is not an imperative prerequisite as will be indicated in further detail hereinbelow but an immiscible heat-transfer material will certainly be easily separable from the reactants after the instant process has been completed. Among other heat transfer materials which may be used in the practice of the process of the present invention are aliphatic and aromatic organic solvents. More specifically illustrative of this class of heat-transfer materials are benzene, toluene, xylene, mineral spiirts, kerosene, Solvesso #100, Solvesso #150, Varsol #1, Varsol #2, #80 white oil, or the aliphatic monohydric alcohols such as methanol, ethanol, propanol, butanol, or the ketones such as cetone, diethylketone, methylethylketone, methylpropylketone, methylamylketone, methylbutylketone, or the ethers such as diethylether, dipropylether, dibutylether or aliphatic hydrocarbons such as hexane, heptane, octane, nonane, decane and the like. Whenever compatability between these heat transfer agents exists they may be used in combination with one another but in most instances it will be preferred to use these heat-transfer materials singly. The heat transfer materials set forth hereinabove and identified by their trademarks have been described in greater detail in the U.S. Patents 2,590,655, 2,713,039 and 2,944,991 among other publications.

The cutting kettle is usually fitted with a coil or a jacket in order that the solvent can be heated to a temperature above room temperature such as at about 50 or 60° C. in order that upon the addition of the hot polyester resin composition that a too sudden cooling of the resin will be avoided. After the mixed liquids have been charged to the cutting kettle in the required amount and heated to the selected temperature, a vacuum is applied to the system and regulated at a value corresponding to the vapor pressure of the heat-transfer liquid material at the desired cutting temperature. Temperatures below 50° C. in the liquid mixture in the cutting kettle should be avoided inasmuch as the resin may well congeal in the cutting kettle before it has an opportunity to disperse throughout the monomer heat-transfer liquid material mixture. For all practical purposes, the temperature of the mixture of liquids in the cutting kettle should not exceed about 80° C.–100° C. Water is the preferred heat-transfer liquid material used in the process of the present invention. When water is utilized at a temperature of 50° C., a vacuum of about 90 mm. of mercury should be applied to the system. At 60° C., a vacuum of 150 mm. of mercury may be used; at 70° C., a vacuum of 235 mm. of mercury may be used; at 80° C., a vacuum of about 355 mm. of mercury may be used. Temperatures below 50° C. may be used including temperatures down at 25° C., except as is noted hereinabove, provided that a high speed agitator is available in order to achieve complete dispersion before gelation sets in upon cooling and provided that a high enough vacuum can be applied to the system such as a vacuum around 1 mm. of mercury. These pressure values are given in absolute terms, i.e., a vacuum of 90 mm. of mercury is 670 mm. below one standard atmospheric pressure. It is often advantageous to warm the heat-transfer liquid material to its boiling point at the vacuum pressure. The hot resin may then be metered into the cutting kettle at any selected rate but preferably at a rate which will not overload the condenser superimposed above the cutting kettle which is cooled sufficiently to condense the heat-transfer material and return said condensed material to the cutting kettle. The maximum cutting rate and correspondingly the minimum cutting time is a function of the condenser cooling capacity. One skilled in the art confronted with a given set of conditions will be able to calculate readily the most advantageous size for the condenser. The amount of heat transfer liquid material used in the process of the present invention may also be determined readily by straight forward calculations. One should make certain that there is present in the cutting kettle a sufficient amount of the heat-transfer agent so as to absorb the sensible heat from the hot polyester resin through volatilization and return to the cutting kettle as condensed liquid so as to provide always a supply of the heat-transfer liquid material in the cutting kettle for use in cooling the hot polyester resin during its addition. Furthermore, additional heat-transfer liquid material can be added during the course of the cutting operation if necessary.

Reference is made to the accompanying drawing which is virtually self-explanatory. The cutting kettle is equipped with an agitator, a monomer and heat-transfer liquid material charge inlet, an uncut resin inlet and a valve for removing the cut resin. The cutting kettle is additionally equipped with a coil or jacket in order to provide auxiliary control of the temperature in the cutting kettle. Superimposed above the cutting kettle and connected thereto by a two-way conduit is the condenser which is cooled by suitable means such as water cooled coils into which the volatilized heat-transfer material is permitted to enter, is condensed and returned to the cutting kettle as a liquid ready for reuse in extracting sensible heat from the cutting kettle. Above the condenser is the vacuum system complete with the conventional vacuum control valves and instruments. It is immaterial if some of the heat-transfer liquid material escapes through the upper part of the condenser as the loss of such material would be of no appreciable consequence, particularly if the preferred material is used, namely water. If more valuable heat-transfer materials are used they are not permitted to escape. If necessary, additional heat-transfer material can be added to the cutting kettle during the course of the operation through the charge inlet at the top of the cutting kettle. When the hot resin addition has been completed, it will be necessary to remove the heat-transfer liquid material from the resin-monomer composition. This can readily be accomplished by continuing the operation but cutting the condensed heat-transfer liquid out of the system by removing the same from the condenser when and as condensed.

In order that the present invention may be more completely understood, the following examples are set forth in which all parts are parts by weight. These examples are set forth primarily for the purpose of illustration and any specific enumeration of detail contained therein should not be interpreted as a limitation on the case except as is indicated in the appended claims.

*Example 1*

Into a suitable reaction vessel equipped with a reflux condenser, an agitator and a vacuum line to a vacuum pump substantially as is outlined in the accompanying drawing there is introduced 1500 parts of diallyl phthalate and 100 parts of water. Vacuum was applied to the system amounting to 25 inches of mercury while introducing through the hot resin inlet a preformed hot (190° C.) polyester resin amounting to 3293 parts. The hot resin is admitted at such a rate so as to maintain reflux and 90° C. reduction flask temperature at the indicated vacuum. When the polyester resin is completely added, the vacuum is increased to 29 inches of mercury and the temperature is increased to 90–100° C. until no further bubbling of the cooled alkyd resin is observed.

*Example 2*

Into a suitable reaction vessel equipped as in Example 1 and the accompanying drawing there is introduced 1500 parts of diallyl phthalate and 100 parts of methanol. Into this reaction vessel there is introduced under vacuum 3500 parts of a polyester resin at 190°° C. The polyester resin is admitted at such a rate so as to maintain reflux in the condenser with the partially reduced polyester resin at 80°–90° C. When the polyster resin is completely added, the vacuum is increased to 29 inches of mercury and the temperature of the materials in the cutting kettle is increased to 90°–100° C. and held at that temperature until no further bubbling of the reduced polyester resin is observed. At this point substantially all of the methanol has been removed.

*Example 3*

Into a suitable reaction vessel equipped as before there is introduced 1500 parts of diallyl phthalate and 100 parts of V.M.P. naphtha. Into this reaction vessel there is introduced under vacuum 3313 parts of an unsaturated polyester resin freshly prepared and still at 190° C. The polyester resin was introduced into the blending kettle at such a rate so as to maintain reflux and a temperature of 90°–100° C. under a vacuum of 25–28 inches of mercury. When the polyester resin is completely heated, the vacuum is increased to 29 inches and the vacuum reduction flask at 90°–100° C. and held there until no further bubbling of the reduced alkyd is observed.

Reference is made to the U.S. Patents Nos. 2,443,735–41 inclusive and 2,510,503 which are illustrative of the types of polyester resins used in the practice of the process of the present invention as well as some of the high boiling polymerizably reactive monomers utilized therewith. These patents are incorporated herein by reference.

I claim:

1. A process comprising blending a hot unsaturated polyester resin, said resin having a temperature at the time of blending between 150° C. and 250° C. and said resin having been prepared by reacting a polyhydric alcohol with an alpha, beta-ethylenically unsaturated dicarboxylic acid with a polymerizable monomeric material having a boiling point above 250° C. in the presence of a heat-transfer liquid material having a boiling point below 200° C. while subjecting the system to a vacuum, varying between about 90 mm. of mercury and 736.6 mm. of mercury, absolute pressure, with temperatures of the monomeric material admixed with the heat transfer material held correspondingly from about 50° C. to 100° C., whereby the heat-transfer liquid is volatilized so as to remove sensible heat from the system, condensing the heat-transfer liquid and returning said liquid to the system until the hot unsaturated polyester resin addition is completed, thereafter removing said heat-transfer liquid from the system.

2. A process comprising blending a hot unsaturated polyester resin, said resin having a temperature at the time of blending between 150° C. and 250° C. and said resin having been prepared by reacting a polyhydric alcohol with an alpha, beta-ethylenically unsaturated dicarboxylic acid with triallyl cyanurate in the presence of a heat-transfer liquid material having a boiling point below 200° C. while subjecting the system to a vacuum, varying between about 90 mm. of mercury and 736.6 mm. of mercury, absolute pressure, with temperatures of the triallyl cyanurate admixed with the heat transfer material held correspondingly from about 50° C. to 100° C., whereby said liquid is volatilized so as to remove sensible heat from the system, condensing said liquid and returning said liquid to the system until the hot unsaturated polyester resin addition is completed, thereafter removing said heat-transfer liquid from the system.

3. A process comprising blending a hot unsaturated polyester resin, said resin having a temperature at the time of blending between 150° C. and 250° C. and said resin having been prepared by reacting a polyhydric alcohol with an alpha, beta-ethylenically unsaturated dicarboxylic acid with a polymerizable monomeric material having a boiling point above 250° C. in the presence of water while subjecting the system to a vacuum, varying between about 90 mm. of mercury and 736.6 mm. of mercury, absolute pressure, with temperatures of the monomeric material admixed with water held correspondingly from about 50° C. to 100° C., whereby the water is volatilized so as to remove sensible heat from the system, condensing the water and returning it to the system until the hot unsaturated polyester resin addition is completed, thereafter removing said water from the system.

4. A process comprising blending a hot unsaturated polyester resin, said resin having a temperature at the time of blending between 150° C. and 250° C. and said resin having been prepared by reacting a polyhydric alcohol with an alpha, beta-ethylenically unsaturated dicarboxylic acid with triallyl cyanurate in the presence of water while subjecting the system to a vacuum, varying between about 90 mm. of mercury and 736.6 mm. of mercury, absolute pressure, with temperatures of the triallyl cyanurate admixed with water held correspondingly from about 50° C. to 100° C., whereby the water is volatilized so as to remove sensible heat from the system, condensing the water and returning it to the system until the hot unsaturated polyester resin addition is completed, thereafter removing said water from the system.

5. A process comprising blending a hot unsaturated polyester resin, said resin having a temperature at the time of blending between 150° C. and 250° C. and said resin having been prepared by reacting a polyhydric alcohol with an alpha, beta-ethylenically unsaturated dicarboxylic acid with diallyl phthalate in the presence of a heat-transfer liquid material having a boiling point below 200° C. while subjecting the system to a vacuum, varying between about 90 mm. of mercury and 736.6 mm. of mercury, absolute pressure, with temperatures of the diallyl phthalate admixed with the heat transfer material held correspondingly from about 50° C. to 100° C., whereby said liquid is volatilized so as to remove sensible heat from the system, condensing said liquid and returning said liquid to the system until the hot unsaturated polyester resin addition is completed, thereafter removing said heat-transfer liquid from the system.

6. A process comprising blending a hot unsaturated polyester resin, said resin having a temperature at the time of blending between 150° C. and 250° C. and said resin having been prepared by reacting a polyhydric alcohol with an alpha, beta-ethylenically unsaturated dicarboxylic acid with diallyl phthalate in the presence of water while subjecting the system to a vacuum, varying between about 90 mm. of mercury and 736.6 mm. of mercury, absolute pressure, with temperatures of the diallyl phthalate admixed with water held correspondingly from about 50° C. to 100° C., whereby the water is volatilized so as to remove sensible heat from the system, condensing the water and returning it to the system until the hot unsaturated polyester resin addition is completed, thereafter removing said water from the system.

References Cited in the file of this patent

UNITED STATES PATENTS

| | | |
|---|---|---|
| 1,677,551 | Delas | July 17, 1928 |
| 1,988,768 | Aldridge | Jan. 22, 1935 |
| 2,443,736 | Kropa | June 22, 1948 |
| 2,510,503 | Kropa | June 6, 1950 |
| 2,716,592 | Skelly et al. | Aug. 30, 1955 |
| 2,843,556 | Moorman | July 15, 1958 |

UNITED STATES PATENT OFFICE
CERTIFICATE OF CORRECTION

Patent No. 3,036,031                        May 22, 1962

William Dean Holland

It is hereby certified that error appears in the above numbered patent requiring correction and that the said Letters Patent should read as corrected below.

Column 1, line 68, for "How-" read -- However --; column 2, line 3, for "cease" read -- cause --; line 33, for "frorm" read -- from --; column 4, line 30, for "spiirts" read -- spirits --; line 73, for "at" read -- to --; column 6, line 16, for "190°° C." read -- 190° C. --.

Signed and sealed this 30th day of October 1962.

(SEAL)
Attest:

ERNEST W. SWIDER
Attesting Officer

DAVID L. LADD
Commissioner of Patents